United States Patent

Adley

[11] Patent Number: 5,930,083
[45] Date of Patent: Jul. 27, 1999

[54] HOT CRIMP ATTACHMENT OF SUSPENSION TO ACTUATOR ARM IN A DISK DRIVE

[75] Inventor: James M. Adley, Hutchinson, Minn.

[73] Assignee: Questek Innovations, Inc., Waconia, Minn.

[21] Appl. No.: 08/938,621

[22] Filed: Sep. 25, 1997

[51] Int. Cl.$^6$ ....................................................... G11B 5/55
[52] U.S. Cl. ............................................................... 360/106
[58] Field of Search ................................... 360/104, 105, 360/106, 107

[56] References Cited

U.S. PATENT DOCUMENTS

| | | | |
|---|---|---|---|
| 4,797,763 | 1/1989 | Levy et al. | 360/104 |
| 4,829,395 | 5/1989 | Coon et al. | 360/104 |
| 4,943,875 | 7/1990 | Reidenbach et al. | 360/104 |
| 5,198,945 | 3/1993 | Blaesser et al. | 360/104 |
| 5,283,704 | 2/1994 | Reidenbach | 360/104 |
| 5,296,984 | 3/1994 | Fick | 360/104 |
| 5,319,512 | 6/1994 | Grapenthin | 360/106 |
| 5,355,267 | 10/1994 | Aoyagi et al. | 360/104 |

Primary Examiner—David D. Davis
Attorney, Agent, or Firm—Schwegman, Lundberg, Woessner, and Kluth, P.A.

[57] ABSTRACT

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm which allows a suspension to be attached to materials other than metals, such as composite materials or ceramic materials. The arm is provided with a protruding attachment feature. In the preferred embodiment, two protruding attachment features are provided. The suspension includes at least one folding metal tab that is tightly folded around the attachment feature while the metal is at an elevated temperature. One metal tab is provided for each attachment feature on the arm. The elevated temperature used while the suspension is attached to the attachment feature is above the operating temperature of the drive. The resulting attachment forms a rigid compressional bond between the shrinking metal and unyielding arm material.

16 Claims, 6 Drawing Sheets

FIG. 7

HOT CRIMP ATTACHMENT OF SUSPENSION TO ACTUATOR ARM IN A DISK DRIVE

FIELD OF THE INVENTION

The present invention relates to the field of mass storage devices called disk drives. More particularly, this invention relates to a method and apparatus for attaching a suspension to an arm on an actuator assembly.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

The actuator assembly is composed of many parts that contribute to the performance required to accurately hold the read/write head in the proper position. An actuator includes a pivot assembly, an arm, a voice coil yoke assembly and a head gimbal suspension assembly. A suspension or load beam is part of the head gimbal suspension assembly.

One end of the suspension is attached to the actuator arm. The read/write head is found attached to the other end of the suspension. One end of the actuator arm is coupled to a pivot assembly. The pivot assembly is in turn connected to a servo motor system through the voice coil yoke. The other end of the actuator arm is attached to the head gimbal suspension assembly. The head gimbal suspension assembly allows the read/write head to gimbal for pitch and roll to follow the topography of the imperfect memory disk surface. The head gimbal assembly also restricts motion with respect to the radial and circumferential directions of the memory disk. The suspension is coupled to the actuator arm as part of the mounting support holding the pivot support and coupled to the servo motor. Currently, the pivot assembly is mounted within an opening in a unitized, machined E-block. The E-block includes arms for mounting the suspension on one end and a voice coil yoke on the other end. U.S. Pat. No. 5,283,704 issued to Reidenbach illustrates another actuator system composed of individual components instead of the unitized E-block. This actuator system is "built up" from an actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer. The disk drive system sends control signals to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

Actuator arms act as spring-mass-damper systems and have resonant frequencies that can degrade the performance of the servo system. Every closed loop servo motor system has a predetermined bandwidth in which resonances occurring within the bandwidth degrade the performance of the servo motor system. The actuator arm is one key source of unwanted resonances. Accordingly, the bandwidths of most servo motor systems are designed such that resonances of the actuator arm occur outside the bandwidth. Each actuator arm has a unique resonance characteristic. Current actuator arms are made of stainless steel, aluminum or magnesium. Suspensions are typically made of stainless steel. The resonance characteristics of the arm are such that the bending modes and torsion modes have frequencies that are within the same frequency range as the suspension and the magnetic storage disk (1 KHz to 8 KHz). Great care must be used when designing an actuator system to prevent alignment of resonance modes that would create very high gains and an unstable servo performance.

In other words, in the presence of a resonance, the transducer or read/write head will vibrate causing it to pass away from the center of the desired track. When the resonances of the disk and actuator align or are about the same frequency, the frequency response is amplified so that the amplitude of the vibration is higher and the read/write head travels further away from the center of the desired track.

The key parameter determining the resonance characteristics of the actuator arm is the stiffness-to-mass ratio of the material. The stiffness-to-mass ratio is about the same for aluminum and stainless steel. Of currently available materials beryllium and ceramics have significantly higher stiffness-to-mass ratios over that of currently used stainless steel or aluminum. Beryllium is quite expensive and difficult to process while ceramics are prone to crack, particularly under the shock load conditions associated with ball swaging or operational shock leads. As a result, these materials have not become market acceptable for use as actuator arms.

Currently, the predominant method for attaching suspensions to metal arms is a process referred to as ball swaging. As shown in U.S. Pat. No. 4,829,395 issued to Coon et al., the metal arm is provided with an opening. An insert called a swage plate includes a tubular boss. A suspension is typically welded to the swage plate. The boss and attached suspension is positioned on one side of the arm so that it extends into the opening of the arm. A second boss and attached suspension may be positioned on the other side of the arm so that arm carries two suspensions. An oversized ball is forced through the opening in the one or both of the bosses. This forces the material of the bosses into the material of the arm to attach the suspension to the arm.

There are several problems associated with the swaging technique. There is industry pressure to reduce the spacing between the disks in a disk stack to produce a shorter disk stack. Swage plates are relatively thick and limit the spacing between the disks of a disk stack having multiple disks. This keeps the height of the disk stack relatively high. In addition, swaged connections are difficult to rework. If an actuator assembly having a swaged connection is found to be faulty, the entire actuator assembly must be reworked, including all the good suspensions on the actuator assembly. Another shortcoming of swaging is that it is limited with respect to the type of material that the boss can be forced into. Currently, most arms are made of metal and undergo plastic deformation during the swaging process. Arms made of a more brittle or hard material will simply crack or fail upon being shock loaded by forcing the swage ball through the opening in the boss. As a result, swaging limits the type of arm materials to materials capable of plastic deformation, such as metals.

The demand for greater track density is increasing steadily, so increasing the performance of the actuator assembly by lowering the mass and increasing the resonance frequencies is becoming a requirement for future systems. There is a need for a disk drive system having an actuator arm which has a higher stiffness-to-mass ratio than actuator arms made of stainless steel, aluminum or magnesium. This would produce a disk drive having lower access times and higher track density. Furthermore, there is a need for a method of attaching a suspension to an actuator that allows different arm materials to be used.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm made of a composite material or a ceramic. The material of the arm has a low coefficient of expansion. The transducer is attached to a suspension. The suspension is attached to the arm. The arm, made of a composite or ceramic, includes an attachment end having at least one attachment member. Preferably, the attachment end of the arm has two attachment members. A suspension is provided with folding or crimping tabs which are folded around the attachment members. The ends of the folding or crimping tabs can be welded into place. A rigid bond is accomplished by folding or crimping tabs on the metal suspension around attachment members while the metal tabs are heated to around 200° C. The folding or crimping operation produces a zero clearance fit between the suspension and the arm at the time of crimping. As the metal cools it shrinks and forms a high tension fit around the arm attachment member which, due to a low coefficient of expansion, will not shrink. This produces a rigid bond between the arm and the suspension as long as the temperature remains below the mounting temperature.

The fiber composite or a ceramic can support very high compressional stress up to a level that will yield the metal wrapping. After cooling, the joint will remain at the maximum residual stress capability of the metal. Temperature increases after the initial cooldown will decrease the residual stress level in the metal, but as long as substantial stress remains in the metal, then the suspension remains rigidly attached to the arm.

Such rigid attachment is necessary to effect the desired resonance increase to the actuator arm system. No relative movement can be allowed between the suspension and the actuator arm during vibration or a shock event. Movement between the arm and the suspension will cause spurious resonance modes to develop during vibration. Any permanent deformation from a shock event will cause the head position to change, which could lead to read errors. The high compression fit of the suspension onto an extremely rigid arm material will assure that the bond remains rigid under a wide range of conditions.

Advantageously, a rigid bond is established between the metal suspension and ceramic or composite actuator arm that is robust to temperature changes and manufacturing variance. This attachment technique is dependent on the low coefficient of thermal expansion of the arm and the high coefficient of thermal expansion of the metal wrap or band holding the metal suspension to the arm. In addition, the arm material is capable of handling the very high compressive stress exerted by the steel sleeve. If the arm is unable to handle high compression forces, the rigid bond will not be maintainable. The light stiff arm material and the bond material described herein meet these requirements to allow this unique attachment method. A superior high resonance actuator assembly having optimum servo control of actuator position is achieved.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figures 1, 2:
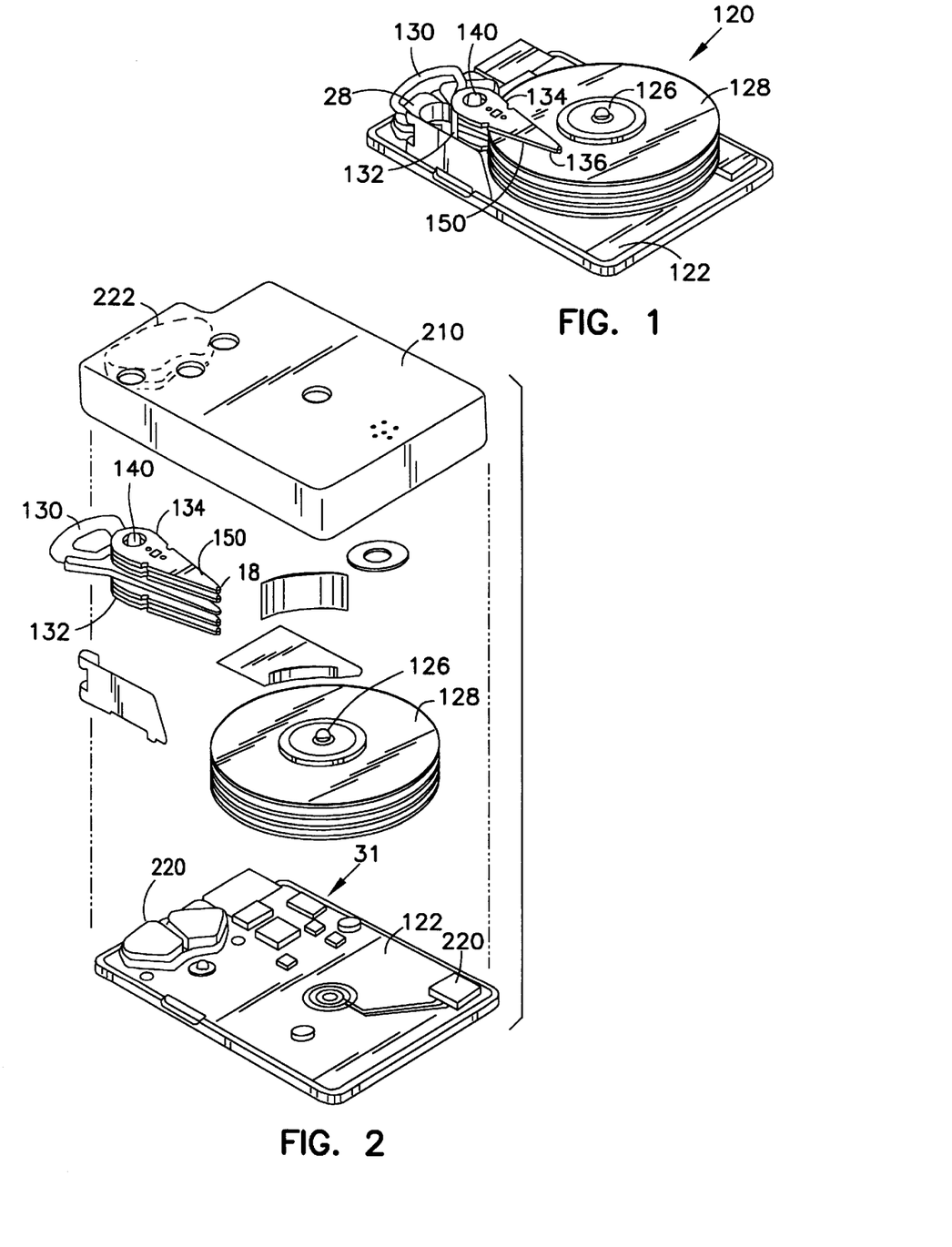
FIG. 1 is an isometric view of a disk drive having a rotating disk, an actuator, and an arm made of a composite material.
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in a transducing relation to the disk 128. The arms 134 are attached to a pivot apparatus, such as a bearing cartridge 140. Attached to the arms 134 are the suspensions 150. The transducers 136 are encapsulated within or supported by a slider or small ceramic block mounted to the suspension. The slider carries the transducer over the disk. The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to move the actuator assembly 132 and, more specifically, the transducers 136, also commonly referred to as read/write heads, to different radial positions relative to one or more surfaces of the disk 128.

Figure 3:
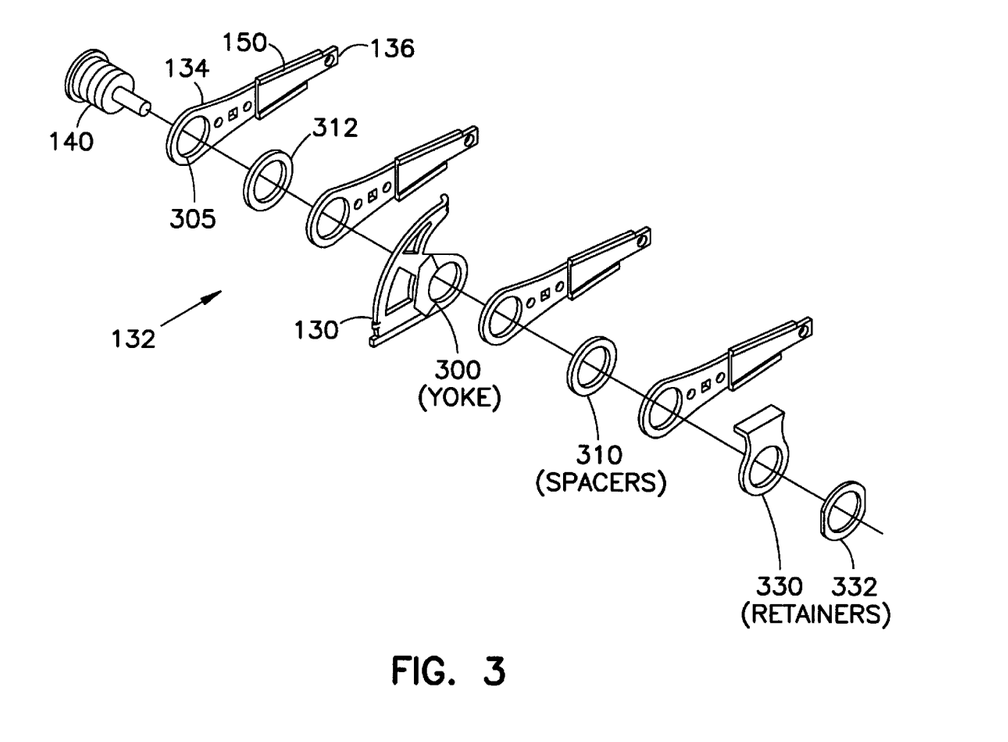
FIG. 3 is an exploded isometric view of an actuator assembly.

FIG. 3 is an exploded isometric view of an actuator assembly 132. The actuator assembly 132 includes a number of arms 134 having suspensions 150 attached to each of the arms. Attached to each of the suspensions 150 is a transducer 136. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism. Each of the arms 134 includes an opening which can receive a rod or other withdrawable tool that can be used for alignment of the various components of the actuator assembly 132.

Figure 4:
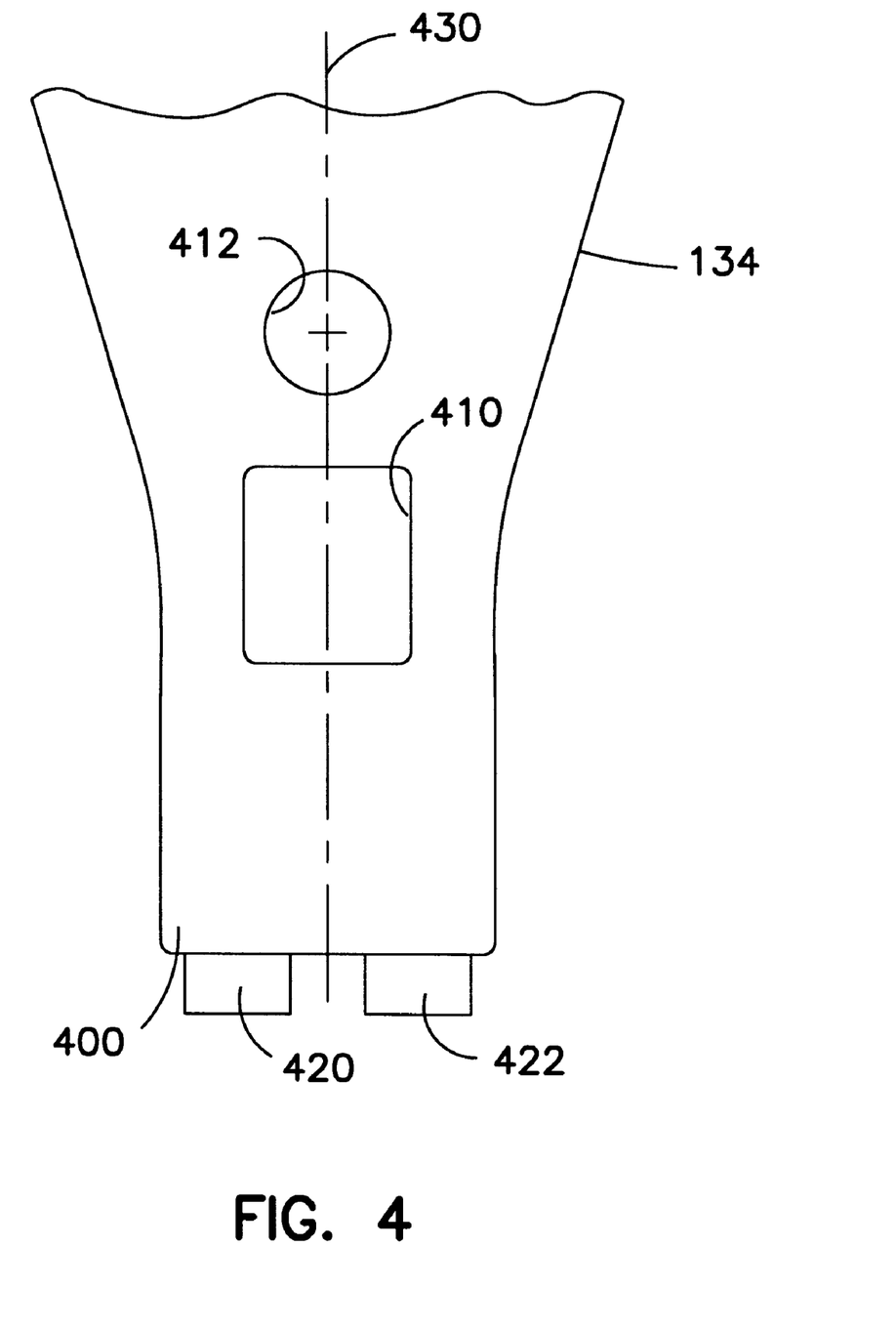
FIG. 4 is a top view of the attachment end of the actuator arm showing the attachment members.

FIG. 4 is a top view of an actuator arm 134. The actuator arm 134 has an opening 305 at one end for attaching to a bearing cartridge (shown in FIG. 3). The other end is a suspension-attach region 400 and includes a first mounting projection or first attachment member 420 and a second mounting projection or second attachment member 422 so that a suspension (shown in FIGS. 5–9) can be attached to the arm 134 without using a swaging technique. The arm 134 also includes an alignment hole 410 and an alignment hole 412 which accommodate alignment tools from a jig used to form the actuator assembly. The alignment holes 410 and 412 maintain the alignment of the various arms as the actuator assembly is assembled. The arm is made of a material having a coefficient of expansion that is lower than the suspension material. The arm 134 also includes a longitudinal axis 430 which is shown in FIG. 4 as a dotted line. The suspension is typically made of metal and usually made from stainless steel. The arm can be made of a composite material such as described in applicant's co-pending application entitled "Disk Drive Using Fiber Composite Material", U.S. Ser. No. 08/912,874, which was filed on Aug. 15, 1997 and is hereby incorporated by reference. The arm 134 could also be made from a ceramic such as Al $B_4C$ Cermet which is available from Dow Chemical Company of Midland, Mich. Either the composite or the ceramic would have a coefficient of thermal expansion which is less than the coefficient of thermal expansion of the metal suspension.

When the arm is made of a fiber or composite material, it includes several layers of elongated fibers bound in a matrix material. One of the layers of the fiber layers has elongated stiffening fibers which run along the length of the arm 134 and are parallel to the longitudinal access 430 of the arm 134. As a result, the first mounting projection or first attachment member 420 includes fibers which run along the length of the projection or attachment member 420, 422. The result is that the projection or attachment member 420, 442 is strengthened by the elongated fibers which run along its length. In addition, the elongated fibers within a layer may be broken on the outside by use of the crimping attachment technique; however, on the inside the bundles of elongated fibers will remain intact and provide for a strong projection of attachment member 420, 422.

Figure 5:
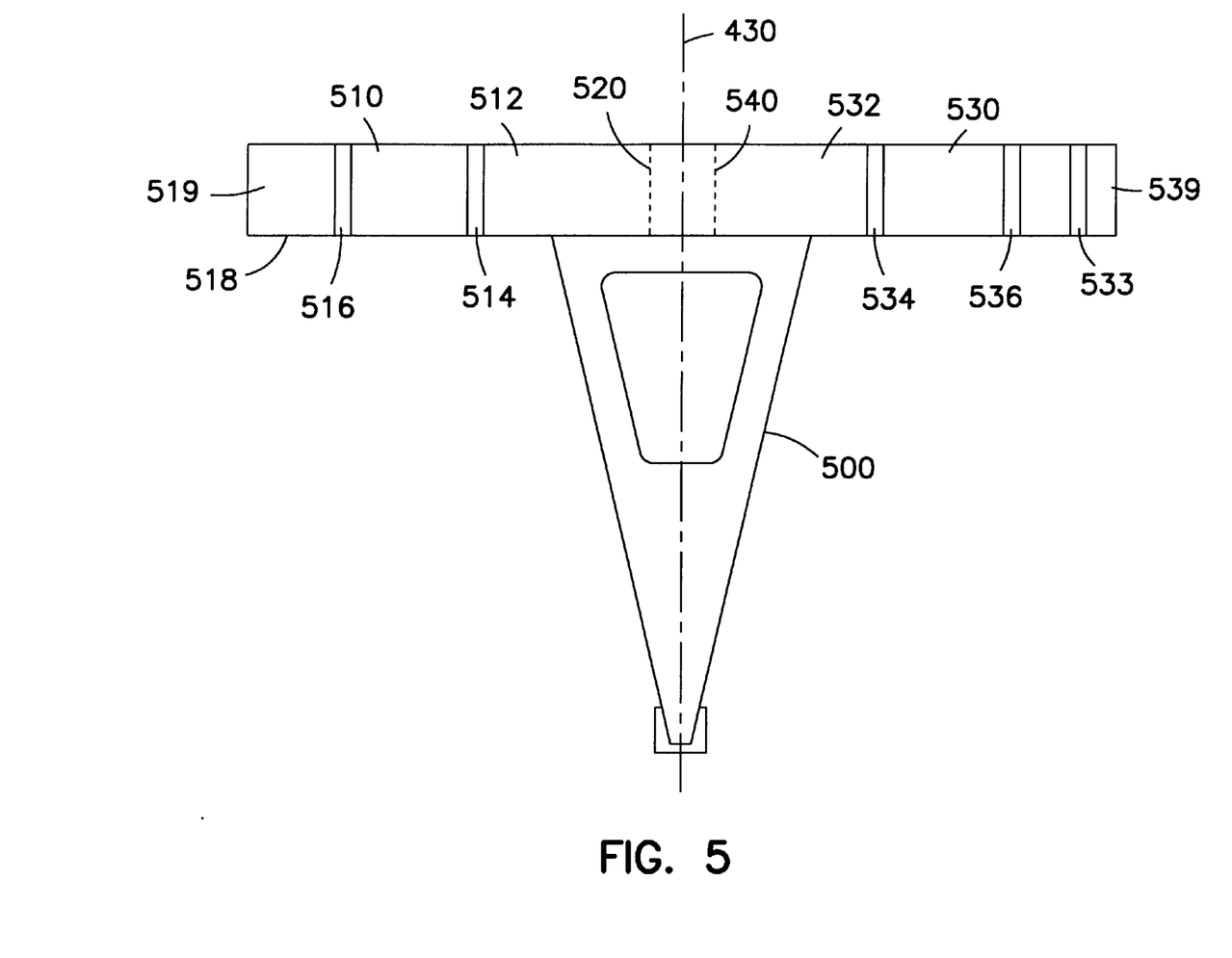
FIG. 5 is a top view of a first suspension element having tabs thereon.

FIG. 5 is a top view of a first suspension element 500, having a first tab 510 and a second tab 530. The tab 510 wraps around or folds around one of the attachment members 420, 422 of the arm 134 (shown in FIG. 4). The tab 530 wraps around the other attachment member or projection 420, 422 of the arm 134. The suspension 500 is usually made of a metal. Commonly, stainless steel is used to make a suspension. If the tabs are formed of the hard metal of the suspension material, localized heat treatment may be necessary to allow the folding to occur in the proper location. The fold locations are shown on tab 510 as fold 512, fold 514, fold 516 and fold 518. On tab 530, there are fold 532, fold 534, fold 536 and fold 538. Each fold is shown as a pair of lines in FIG. 5. In actuality, the lines will not be shown on the tabs 510, 530 of the suspension 500. The lines are shown to define fold regions where localized heating can be done to soften the metal so that a tight wrap of the attachment members 420, 422 can be achieved. Heat treatment is accomplished by localized heating which can be done by a laser sweep over the fold radius region 512, 514, 516, 518, 532, 534, 536, and 538. By heating these fold regions, the metal will yield when a tab 510 or 530 is folded over one of the attachment members. The localized heat treatment will allow the metal in the fold regions to yield as the tab is folded.

The tab 510 has an end 519. The tab 530 has an end 539. After the tab 510 is folded over an arm attachment member 420,422, the end 519 of tab 510 is attached to the suspension at or near the dotted line 520. Of course there are many ways to attach the end 519 to the region 520 of the suspension; however, spot welding or ultrasonic welding is contemplated by this invention. Similarly, the end 539 is attached to the suspension at or near dotted line 540 on the suspension after it has been folded over an attachment member or protrusion 420, 422. The folds and the tabs totally enclose the attachment members 422 and 420 and are locked in placed by using lock tabs or by laser welding.

The localized heating at the folds 512, 514, 516, 518, 532, 534, 536, and 538 is done prior to the folding and attachment process. When the suspension 500 is going to be attached to the arm 134, the suspension 500 is heated to a temperature which is above the operating temperature of the disk drive. This allows for a tight, rigid bond that takes advantage of the differences in the coefficient of thermal expansion between the steel suspension 500 and the arm 134 made of either a composite or a ceramic. The composite or ceramic material has a very low coefficient of thermal expansion and thus will not expand when heated. On the other hand, the metal of the suspension 500 and tabs 510 and 530 will expand as a result of being heated. The suspension 500 is heated and the tab 510 is folded over one attachment member 420, 422 and attached to the suspension along or near dotted line 520. Similarly, while heat is maintained to keep the suspension material in its expanded state, the tab 530 is folded over the other attachment member 420, 422 and then the end 539 is attached at or near the line 540 shown on the suspension 500. The suspension 500 and the arm are then allowed to cool. As the arm 134 and the attachment members 420, 422 cool, there is little or no difference in the size, length or distance around the perimeter of the attachment member 420, 422. On the other hand, while the suspension 500 and the tabs 510 and 530 cool, the length of the material shortens because of its relatively high coefficient of thermal expansion when compared to the arm material. The metal tabs 510 and 530 shrink significantly to form a rigid, shock-resistant bond between the actuator arm 134 and the suspension 500. Since the tabs 510 and 530 shrink significantly, the metal in the tabs has a high tensional residual stress because of the unyielding nature of either the fiber composite or ceramic material used to make the projections or attachment members 420, 422.

Figure 6:
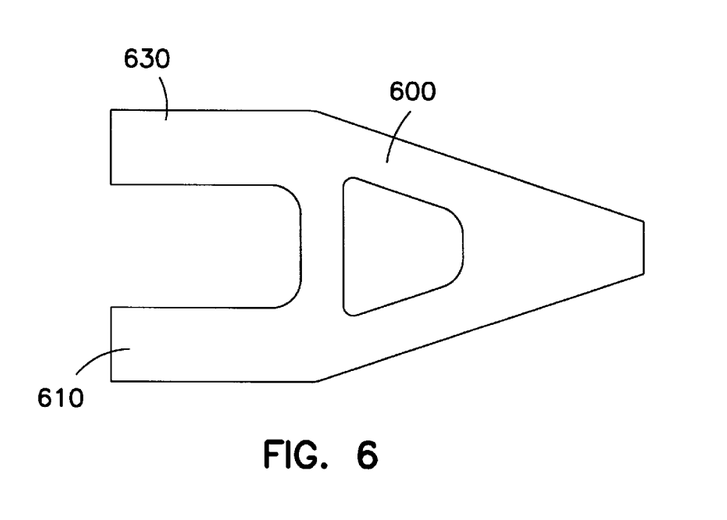
FIG. 6 is a top view of a second suspension element.

FIG. 6 is a top view of second suspension element 600. The second suspension element 600 includes a finger 610 and a finger 630. Many times it is desired to have a second suspension 600 attached to the arm 134. By attaching the second suspension 600 to the arm 134, arm 134 can be placed between two disks in a disk stack and two disk surfaces can be read by the same arm 134. The process for attaching the suspension 500 to the attachment members 420, 422 is followed and an additional step of placing the finger 610 on one of the attachment members 420, 422 and the other finger 630 on the other attachment member is added to the process. In other words, an arm attachment member 420, 422 is placed between the attachment line 520 on the suspension and the first fold 512. The other attachment member 420, 422 is placed between the fold 432 and the line 540 on the suspension 500. If one suspension is going to be attached to the arm 134, the tabs are merely folded around the arm and the end 519 is attached to line 520 and the end 539 is attached at or near line 540 on the suspension. If two suspensions are to be added, the fingers 610 and 630 are placed on the opposite edge of the projecting members or attachment members 420, 422. When the tab 510 is folded around the arm, the finger 610 will be captured between folds 514 and 516 on the tab 510. Similarly, the other finger 630 will be captured between folds 534 and 536 on the tab 530. As the first suspension 500, the second suspension 600, and the arm 134 cool, a tight bond is formed just as mentioned in the previous paragraph. The suspensions 500 and 600 can be aligned using tooling holes during the folding process. Using the tooling holes results in parallel alignments of the suspensions 500 and 600. The suspensions 500 and 600 are held in a fixed position during the fold and crimping operation. The suspensions and arm are also held as the end of the tab 519 is attached to the suspension at or near dotted line 520 and while the end of the tab 530 is attached at or near line 540 on the suspension 500. It should be noted that when suspension 500 and suspension 600 are going to be attached to a single arm, the height dimension such as between tabs 512 and 514 must be lengthened to accommodate the thickness of the finger 610 or 630 of the suspension 600.

Figure 7:
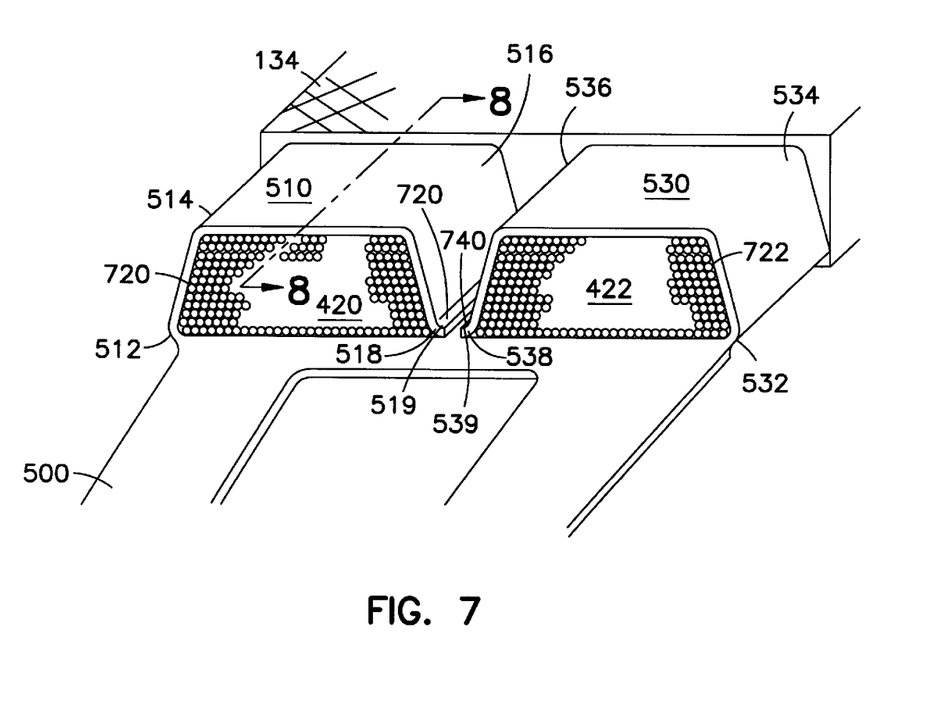
FIG. 7 is a perspective view showing the first suspension element having tabs thereon attached to the suspension attachment members.
Figure 8:
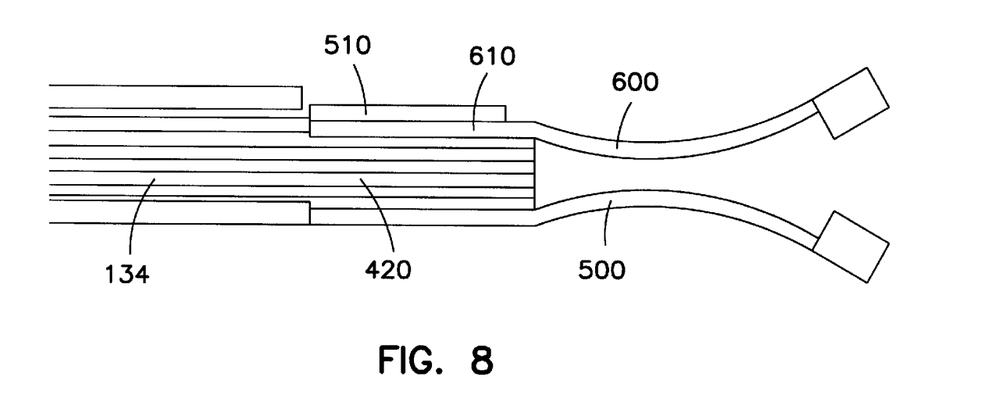
FIG. 8 is a cutaway side view showing the first suspension element having tabs thereon and the second suspension element attached to the suspension attachment members.

FIG. 7 is a prospective view showing the first suspension element 500 attached to the arm 134. In this particular figure, the attachment member 420 and the attachment member 422 are made of a fiber composite which has elongated fibers. The elongated fibers are shown at their ends as small circles which are bundled together. The small circles are numbered 720 and 722. It should be noted that a ceramic material can also be used in forming the arm 134 and the attachment members 420 and 422. The folded regions 412, 414, 416, 418, 532, 534, 536 and 538 each occur at a corner portion of the attachment member 420 or 422. The end 519 of tab 510 is attached to the suspension along line 520 (not shown in FIG. 7, but shown in FIG. 5). Similarly, the end 539 of the tab 530 is attached to the suspension at or near line 540 (not shown in FIG. 7, but shown in FIG. 5). A laser weld 728 is used to attach tab 510 to line 520. Similarly, a laser weld 740 is used to attach tab 530 to line 540. It should be noted that when the second suspension is attached to the arm 134, the finger 610 will fit beneath the tab 510 between folds 514 and 516, and the finger 630 will fit between the folds 534 and 536 between the tab 530 and the attachment element 422. The attachment of the second suspension 600 is best shown in a cross-sectional view of FIG. 8. FIG. 8 shows the arm 134 having a protrusion or attachment member 420. Suspension 500 is attached to the attachment member 420 and tab 510 is shown as capturing the finger 610 of the second suspension between the tab 510 and the attachment member 420.

Advantageously, a rigid bond is established between the metal suspension and ceramic or composite actuator arm that is robust to temperature changes and manufacturing variance. This attachment technique is dependent on the low coefficient of thermal expansion of the arm and the high coefficient of thermal expansion of the metal wrap or band holding the metal suspension to the arm. In addition, the arm material is capable of handling the very high compressive stress exerted by the steel sleeve. If the arm is unable to handle high compression forces, the rigid bond will not be maintainable. The light stiff arm material and the bond material described herein meet these requirements to allow this unique attachment method. A superior high resonance actuator assembly having optimum servo control of actuator position is achieved.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator assembly for a disk drive comprising:

an arm having a longitudinal axis and an attachment end, said attachment end further including at least one attachment member projecting from the attachment end in a direction along the longitudinal axis, the at least one attachment member having a peripheral surface;

a suspension extending in the direction of the longitudinal axis and including at least one elongated tab having a free end cantilevered from the suspension and extending transverse the direction of the longitudinal axis from the suspension, the suspension having a first planar surface and the at least one elongated tab having a second planar surface forming one continuous planar surface, the peripheral surface of the at least one attachment member contacting the continuous planar surface of the suspension and the at least one elongated tab when the free end of the at least one elongated tab is attached to the first planar surface of the suspension such that the at least one elongated tab surrounds the peripheral surface of the at least one attachment member;

a transducer attached to said suspension.

2. The actuator assembly of claim 1 wherein the at least one elongated tab attached to the suspension is made of metal, said arm made of a material having a lower coefficient of expansion than said metal.

3. The actuator assembly of claim 2 wherein the arm is made of a ceramic material.

4. The actuator assembly of claim 3 wherein the arm includes elongated stiffening fibers.

5. The actuator assembly of claim 1 wherein the arm and the suspension and at least one elongated tab are heated to a temperature where the tab elongates as a result of absorbing heat as the tab is folded over the attachment member.

6. The actuator assembly of claim 1 wherein the at least one attachment member includes a first and a second attachment member.

7. The actuator assembly of claim 6 wherein the at least one elongate tab member has a first tab and a second tab for folding over the first attachment member and the second attachment member.

8. The actuator assembly of claim 7 wherein portions of the tabs are heat treated.

9. The actuator assembly of claim 8 wherein the portions of the tabs which are heat treated are the areas which undergo bending as the first tab and the second tab are folded over the first attachment member and the second attachment member.

10. An actuator assembly for a disk drive comprising:

an arm having a longitudinal axis and an attachment end, said attachment end further including
a first attachment member having a first peripheral surface; and
a second attachment member having a second peripheral surface; the first and second attachment members projecting from the attachment end in a direction along the longitudinal axis;

a first suspension extending in the direction of the longitudinal axis and including first and second elongated tabs having first and second free ends cantilevered from the first suspension and extending transverse the direction of the longitudinal axis from the first suspension, the first suspension having a planar suspension surface and the first and second elongated tabs having a planar tab surface forming one continuous planar surface, the first peripheral surface of the first attachment member contacting the continuous planar surface of the first suspension and the first elongated tab when the first free end of the first elongated tab is attached to the planar suspension surface of the first suspension such that the first elongated tab surrounds the first peripheral surface of the first attachment member;

the second peripheral surface of the second attachment member contacting the continuous planar surface and the second elongated tab when the second free end of the second elongated tab is attached to the planar suspension surface of the first suspension such that the second elongated tab surrounds the second peripheral surface of the second attachment member;

a second suspension further comprising:
a first finger captured between the first elongated tab of the first suspension and the first peripheral surface of the first attachment member; and
a second finger captured between the second elongated tab of the first suspension and the second peripheral surface of the second attachment member.

11. The actuator assembly of claim 10 wherein the arm further comprises:

a first substantially planar surface; and
a second substantially planar surface,
wherein one of the first or second suspensions is attached so that it is positioned near the first substantially planar surface, and the other of the first or second suspensions is attached so that it is positioned near the second substantially planar surface.

12. The actuator assembly of claim 11 wherein the first attachment member and the second attachment member of the arm are positioned between planes defined by the first substantially planar surface and the second substantially planar surface of the arm.

13. The actuator assembly of claim 10 wherein, the first attachment member and the second attachment member of the arm substantially symmetrical with respect to the longitudinal axis of the arm.

14. The actuator assembly of claim 10 wherein, the first attachment member, the second attachment member, the first finger captured by said first elongated tab, and the second finger captured by said second elongated tab attached to said arm at a position substantially symmetrical with respect to the longitudinal axis of the arm.

15. An information handling system comprising:

a base;
a disk rotatably attached to said base; and
an actuator assembly movably attached to said base, said actuator assembly to move a transducer to selected areas of the disk and to maintain the transducer in a transducing relationship with said disk, said actuator assembly further comprising:
an arm having a longitudinal axis and an attachment end, said attachment end further including a first attachment member having a first peripheral surface; and a second attachment member having a second peripheral surface; the first and second attachment members projecting from the attachment end in a direction along the longitudinal axis;

a first suspension extending in the direction of the longitudinal axis and including first and second elongated tabs having first and second free ends cantilevered from the first suspension and extending transverse the direction of the longitudinal axis from the first suspension, the first suspension having a first planar surface and the first and second elongated tabs having a second planar surface forming one continuous planar surface, the first peripheral surface of the first attachment member contacting the continuous planar surface of the first suspension and the first elongated tab when the first free end of the first elongated tab is attached to the first planar surface of the first suspension such that the first elongated tab surrounds the first peripheral surface of the first attachment member;

the second peripheral surface of the second attachment member contacting the continuous planar surface and the second elongated tab when the second free end of the second elongated tab is attached to the first planar surface of the first suspension such that the second elongated tab surrounds the second peripheral surface of the second attachment member;

a second suspension further comprising:

a first finger captured between the first elongated tab of the first suspension and the first peripheral surface of the first attachment member; and a second finger captured between the second elongated tab of the first suspension and the second peripheral surface of the second attachment member.

16. The actuator assembly of claim 15 wherein, the first attachment member, the second attachment member, the first finger captured by said first elongated tab, and the second finger captured by said second elongated tab attached to said arm at a position substantially symmetrical with respect to the longitudinal axis of the arm.

* * * * *